Patented Mar. 19, 1940

2,194,302

UNITED STATES PATENT OFFICE 2,194,302

SEPARATION OF AMINO ACIDS FROM PROTEIN

Louis Gerber, Peoria, Ill., assignor, by mesne assignments, to Corn Products Refining Company, New York, N. Y., a corporation of New Jersey No Drawing. Application June 20, 1938, Serial No. 214,730

10 Claims. (Cl. 260—534)

This invention relates to the isolation and recovery of the amino acids, leucine and tyrosine, from solutions of amino acids produced by hydrolysis, more particularly acid hydrolysis using hydrochloric acid as a catalyst, of protein substances or materials containing protein substances, particularly corn (maize) gluten with which this invention is especially concerned.

The hydrolysis of vegetable protein substance, for example corn gluten, produces a solution containing a large number, it is believed seventeen, of amino acids, the solubilities of which depend upon different factors, more particularly hydrogen ion concentration, density and temperature.

The present invention is based upon the discovery that the amino acids, leucine and tyrosine, may be together precipitated from the solution of amino acids produced by the hydrolysis of corn gluten, when the solution is at a proper density and temperature for crystallization to take place by adjustment of pH to a point within a certain range of hydrogen ion concentrations; that a solution of the precipitated mixture of leucine and tyrosine may be adjusted as to pH so as to bring about the precipitation of tyrosine while the leucine remains in solution; and that by further adjustment of pH the leucine may be caused to precipitate. By following this procedure, having at all stages due regard to proper temperatures and concentrations of the solution, adequate yields of relatively pure tyrosine and leucine may be obtained.

The process as applied to de-starched corn (maize) gluten is preferably carried out as follows:

(1) The corn gluten is boiled with a suitable acid, for example 20% hydrochloric acid, and the hydrolysate evaporated and filtered to remove humin substances, which latter may be washed with hot water and the hot water combined with the filtrate for further treatment.

(2) The combined liquors are preferably evaporated, and a suitable alkaline substance, preferably, caustic soda, is added to give the solution a hydrogen ion concentration of pH 6 to 7, preferably, approximately pH 6.4.

(3) The solution is evaporated and allowed to stand at room temperature for several hours, which brings about the precipitation of the leucine-tyrosine mixture.

(4) Assuming that these two amino acids are to be separated, one from the other, the precipitate is dissolved, preferably in weak hydrochloric acid, and is de-colorized with activated carbon and the carbon filtered off.

(5) Caustic soda is then added until the liquor has a hydrogen ion concentration of pH 2.4 to 3.4, preferably pH 2.4.

(6) The neutralized liquor (the term "neutralization", as used herein, being intended to cover a partial neutralization as well as complete neutralization) is cooled to 0°–15° C., preferably to 0°, and precipitation or crystallization of the tyrosine is brought about in any suitable manner, for example, by allowing the solution to stand at the temperature noted.

(7) The solution is filtered off and the crystalline tyrosine dried.

(8) The remaining solution is evaporated and caustic soda added to bring the pH up to 6–7, the preferred pH being 6.5. A small amount of sodium chloride is preferably added to saturate the solution.

(9) Crystallization of the leucine is produced in any desired manner, for example, by allowing the concentrated solution to stand for several hours at room temperature.

(10) The leucine precipitate is removed from the mother liquor by filtration, and is preferably washed with a cold 20% salt solution to remove salt from the leucine crystals. A saturated solution of sodium chloride contains about 28% of the salt. By using a 20% salt solution the solution will be able to take up salt and is capable of dissolving away the coatings of salt on the leucine crystals. Leucine is insoluble in the salt solution. There will still be a small amount of salt in the product, but not as a coating on the crystals.

A specific example of the application of the invention to practice is given below. It is to be understood that this example is purely typical and informative, and that the invention is not to be considered as limited to the operating data given therein. The intention is to cover all equivalents and all modifications of the invention within the scope of the appended claims.

*Example:*—2000 grams of de-starched corn gluten is boiled for seventeen hours with 800 grams of 20% hydrochloric acid. The hydrolysate is evaporated to 4000 cc. and the humin substances, amounting to about 430 grams, removed by filtration. The humin substances are washed with hot water and the washings combined with the filtrate. The combined liquors are evaporated to 2000 cc. About 2500 cc. of 40% caustic soda solution is added until the liquor has a hydrogen ion concentration of pH 6.4. This liquor is evaporated to 2000 cc. and allowed to stand at room temperature for about 10 or 12 hours. The mixture of liquor and precipitated crude leucine-tyrosine is centrifuged and yields about 700 grams of leucine and tyrosine.

This precipitate is dissolved in 500 cc. of hot 1% to 2% hydrochloric acid and de-colorized with 50 grams of carbon for from 15 to 20 minutes. The carbon is then filtered off. Caustic soda is added to the filtrate until the liquor has a hydrogen ion concentration of pH 2.4. The liquor is cooled to 0° C. and is allowed to stand at this temperature for 16 to 48 hours. The precipitate, which consists of about 32 grams of pure tyrosine, is filtered off. The filtrate consisting of a solution containing leucine is evaporated to 1500 cc. and caustic soda added to raise the hydrogen ion concentration to pH 6.5. Enough sodium chloride is added to give a saturated solution. This solution is allowed to stand for 12 to 16 hours and is then filtered to separate the leucine precipitate which is preferably washed with a cold 20% salt solution to remove traces of salt from the leucine. The amount of leucine recoverable in this way is about 155 grams.

The process gives about a 40% yield of leucine and a 20% yields of tyrosine; that is, from 100 pounds of corn gluten, there can be produced about 15 pounds of leucine and 2 pounds of tyrosine.

I claim:

1. Process of obtaining a mixture of leucine and tyrosine substantially free of other amino acids from a solution of amino acids produced by the hydrolysis of corn gluten with hydrochloric acid which comprises adjusting the hydrogen ion concentration of the solution to a point between pH 6 and 7 to bring about precipitation of the specified amino acids, and separating the precipitate from the solution.

2. Process of obtaining a mixture of leucine and tyrosine substantially free of other amino acids from a solution of amino acids produced by the hydrolysis of corn gluten with hydrochloric acid which comprises adjusting the hydrogen ion concentration of the solution to approximately pH 6.4 to bring about precipitation of the specified amino acids and separating the precipitate from the solution.

3. Process of obtaining tyrosine from a solution of amino acids produced by the hydrolysis of corn gluten with hydrochloric acid which comprises adjusting the hydrogen ion concentration of the solution to a point between pH 6 and 7, separating the leucine-tyrosine precipitate from the solution, dissolving the precipitate, adjusting the hydrogen ion concentration of the solution to a point between pH 2.4 and 3.4, and separating the tyrosine precipitate from the solution.

4. Process of obtaining tyrosine from a solution of amino acids produced by the hydrolysis of corn gluten with hydrochloric acid which comprises adjusting the hydrogen ion concentration of the solution to a point between pH 6 and 7, separating the leucine-tyrosine precipitate from the solution, dissolving the precipitate and adjusting the hydrogen ion concentration of the solution to a point between pH 2.4 and 3.4, cooling the solution to 0°–15° C. and separating the tyrosine precipitate from the solution.

5. Process of obtaining tyrosine from a solution of amino acids produced by the acid hydrolysis of corn gluten with hydrochloric acid which comprises adding to the solution caustic soda to adjust the hydrogen ion concentration to approximately pH 6.4, separating the precipitate; dissolving the precipitate in a weakly acid solution, adjusting the hydrogen ion concentration of the solution by addition of caustic soda to about pH 2.4, and removing the tyrosine precipitate from the solution.

6. Process of obtaining tyrosine from a solution of amino acids produced by the hydrolysis of corn gluten with hydrochloric acid which comprises adding caustic soda to adjust the hydrogen ion concentration of the solution to approximately pH 6.4, separating the precipitate from the solution, dissolving the precipitate in a weakly acid solution; adding caustic soda to adjust the pH of the solution to approximately 2.4, cooling the solution to 0°–15° C., and removing the tyrosine precipitate from the solution.

7. Process of obtaining tyrosine from a solution of amino acids produced by the hydrolysis of protein substance which comprises adjusting the hydrogen ion concentration of the solution to between pH 6 and 7, separating the precipitate and dissolving it, adjusting the hydrogen ion concentration of the solution to between pH 2.4 and 3.4, and separating the tyrosine precipitate from the solution.

8. Process of obtaining leucine from a solution of amino acids produced by the hydrolysis of corn gluten with hydrochloric acid which comprises adjusting the pH of the solution to about 6–7 to bring about the precipitation of a mixture of tyrosine and leucine, removing and dissolving the precipitate, adjusting the hydrogen ion concentration of the solution to a pH of about 2.4–3.4 which will bring about the precipitation of the tyrosine, filtering the precipitate from the solution; adjusting the hydrogen ion concentration of the filtrate to about pH 6–7 to bring about precipitation of leucine, separating the leucine precipitate from the solution and washing the same with an unsaturated solution of sodium chloride to remove residual salt.

9. Process of obtaining leucine from a solution of amino acids produced by the hydrolysis of corn gluten with hydrochloric acid which comprises, adjusting the hydrogen ion concentration of the solution to between pH 6 and 7, separating and dissolving the leucine-tyrosine precipitate; adjusting the hydrogen ion concentration of the solution to between 2.4–3.4, filtering the tyrosine precipitate from the solution; adjusting the hydrogen ion concentration of the filtrate to between pH 6 and 7, and separating the leucine precipitate from the solution.

10. Process of obtaining leucine from a solution of amino acids produced by the hydrolysis of corn gluten with hydrochloric acid which comprises, adjusting the hydrogen ion concentration of the solution to approximately pH 6.4, separating and dissolving the tyrosine-leucine precipitate; adjusting the hydrogen ion concentration of the solution to approximately pH 2.4, filtering the tyrosine precipitate from the solution, adjusting the hydrogen ion concentration of the filtrate to approximately 6.5 pH; and separating the leucine precipitate from the solution.

LOUIS GERBER.